(12) United States Patent
Sipma

(10) Patent No.: US 10,744,923 B2
(45) Date of Patent: Aug. 18, 2020

(54) EXTENDIBLE BOOM SUSPENDED VEHICLE TOWING

(71) Applicant: Randy Lee Sipma, Penrose, CO (US)

(72) Inventor: Randy Lee Sipma, Penrose, CO (US)

(73) Assignee: Randy Lee Sipma, Penrose, CO (US)

( * ) Notice: Subject to any disclaimer, the term of this patent is extended or adjusted under 35 U.S.C. 154(b) by 103 days.

(21) Appl. No.: 15/676,645

(22) Filed: Aug. 14, 2017

(65) Prior Publication Data
US 2018/0043815 A1   Feb. 15, 2018

Related U.S. Application Data

(60) Provisional application No. 62/375,214, filed on Aug. 15, 2016.

(51) Int. Cl.
*B60P 3/12* (2006.01)

(52) U.S. Cl.
CPC .................................. *B60P 3/122* (2013.01)

(58) Field of Classification Search
CPC .. B60P 3/122; B60P 3/07; B60P 3/073; B60P 3/079; B60P 3/12; B60P 1/5466; B60P 1/5457; B66C 23/36; B66C 23/53; B66C 23/703; B66C 23/705; B66C 23/701; B66C 23/62; B66C 23/44; B66C 1/20; B66C 2700/0357; B66C 2700/062; B65F 1/227; B62D 53/0857
USPC .................................. 414/563, 427, 460, 546
See application file for complete search history.

(56) References Cited

U.S. PATENT DOCUMENTS

| | | | | |
|---|---|---|---|---|
| 2,107,338 A | * | 2/1938 | Nampa | B60P 3/07 410/15 |
| 3,182,829 A | * | 5/1965 | Wagner | B60P 3/125 294/81.5 |
| 3,516,554 A | * | 6/1970 | Nakamura | B66C 23/703 212/348 |
| 3,765,544 A | * | 10/1973 | Murphy | B23P 19/024 212/231 |
| 3,897,879 A | * | 8/1975 | Bubik | B60P 3/125 414/563 |
| 4,316,617 A | * | 2/1982 | Flaugh | B60D 1/00 280/402 |

(Continued)

FOREIGN PATENT DOCUMENTS

DE       4000915 A1 *  3/1991  ............... B66C 1/20

*Primary Examiner* — Glenn F Myers
(74) *Attorney, Agent, or Firm* — Holzer Patel Drennan

(57) ABSTRACT

When vehicles become disabled on a road or race track, they may be towed away to be repaired or discarded. A disabled vehicle that is repairable but severely damaged may be susceptible to further damage caused by towing it away, which may prevent conventional tow trucks from quickly and easily towing the disabled vehicle away. The presently disclosed vehicle towing system incorporates a telescoping boom extending from a tow vehicle. The telescoping boom includes a first towed vehicle attachment mechanism extending from a distal end of the telescoping boom and a second towed vehicle attachment mechanism extending from a proximal end of the telescoping boom. The first and second vehicle attachment mechanism connect the boom to the disabled vehicle and the boom is used to lift and suspend the disabled vehicle behind the tow vehicle as the disabled vehicle is towed away.

20 Claims, 5 Drawing Sheets

(56) References Cited

U.S. PATENT DOCUMENTS

| | | | | |
|---|---|---|---|---|
| 4,778,333 | A | * | 10/1988 | Youmans ................ B60P 3/125 280/402 |
| 6,491,490 | B1 | * | 12/2002 | Trobee .................... B60P 3/125 280/402 |
| 2003/0168421 | A1 | * | 9/2003 | Davis ...................... B66C 23/72 212/302 |
| 2014/0037411 | A1 | * | 2/2014 | McConnell ............... B60P 3/12 414/563 |
| 2018/0273121 | A1 | * | 9/2018 | Kennedy ............. B62D 63/061 |

* cited by examiner

EXTENDIBLE BOOM SUSPENDED VEHICLE TOWING

CROSS-REFERENCE TO RELATED APPLICATIONS

The present application claims benefit of priority to U.S. Provisional Patent Application No. 62/375,214, entitled "Extendible Boom Suspended Vehicle Towing" and filed on Aug. 15, 2016, which is specifically incorporated by reference herein for all that it discloses or teaches.

BACKGROUND

When vehicles become disabled on a road or race track, they may be towed away to be repaired or discarded. A disabled vehicle that is repairable but severely damaged may be susceptible to further damage caused by towing it away, which may prevent conventional tow trucks from quickly and easily towing the disabled vehicle away. For example, a disabled vehicle may be damaged in a manner that towing it in a conventional way would also damage the underlying road surface by scraping it or leaking fluids from the disabled vehicle onto it. In some instances, a disabled vehicle may be so severely damaged that the vehicle cannot be towed with a front set and/or rear set of tires in contact with the underlying road surface or track. In these cases, the disabled vehicle is often lifted and loaded onto a flatbed truck to be moved off of the road or track. However, the process of lifting and loading a disabled vehicle onto a flatbed truck can be difficult and time consuming, causing further delays to other motorists attempting the use the road or racers continuing a race.

SUMMARY

Implementations described and claimed herein address the foregoing problems by providing a vehicle towing system comprising a telescoping boom extending from a tow vehicle, a first towed vehicle attachment mechanism extending from a distal end of the telescoping boom, and a second towed vehicle attachment mechanism extending from a proximal end of the telescoping boom, wherein a length of the second vehicle attachment mechanism is variable.

Implementations described and claimed herein further address the foregoing problems by providing a method of towing a vehicle comprising orienting a tow vehicle in line with a towed vehicle, extending a boom from the tow vehicle over a top of the towed vehicle, connecting a first end of the towed vehicle to a first towed vehicle attachment mechanism extending from a distal end of the telescoping boom, connecting a second end of the towed vehicle to a second towed vehicle attachment mechanism extending from a proximal end of the telescoping boom, raising the towed vehicle from a road surface, and leveling the towed vehicle with reference to the road surface.

Implementations described and claimed herein still further address the foregoing problems by providing an extendible boom suspended vehicle towing system comprising a base attached to the tow vehicle, a telescoping boom extending from the base and vertically pivotable about the base, a first hydraulic piston to selectively vertically pivot the telescoping boom about the base, a second hydraulic piston to selectively extend the telescoping boom from the base, a first towed vehicle attachment mechanism extending from a distal end of the telescoping boom, and a second towed vehicle attachment mechanism extending from a proximal end of the telescoping boom, wherein a length of the second vehicle attachment mechanism is variable.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Figure 1:
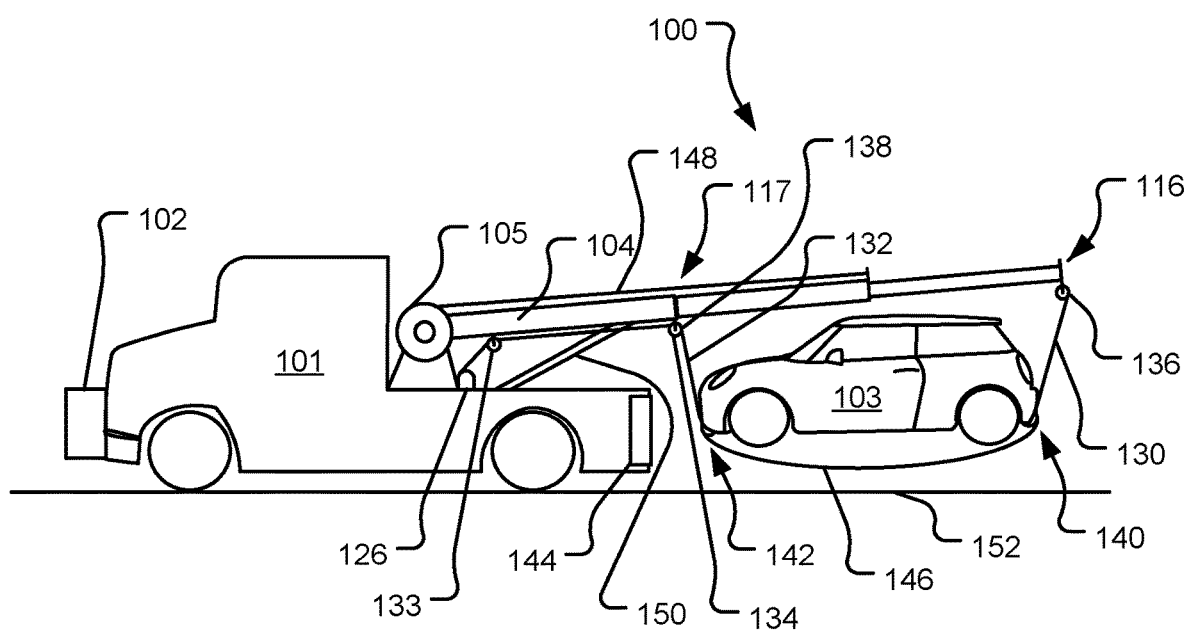
FIG. 1 illustrates a side elevation view of an example extendible boom suspended vehicle towing system in an extended orientation.

FIG. 1 illustrates a side elevation view of an example extendible boom suspended vehicle towing system 100 in an extended orientation. The towing system 100 is supported by and built upon a truck 101 (or tow vehicle). The truck 101 may be any type of chassis cab, flatbed, or pickup truck, so long as it is of a sufficient weight and payload capacity support the load of a disabled vehicle 103. To balance the weight of the disabled vehicle 103 (or towed vehicle), a counter weight 102 may be added to the front end of the truck 101. The counter weight 102 may be made of any suitably heavy material (e.g., steel, concrete) and may be either permanently attached or removable from the truck 101.

The towing system 100 includes an extendible boom 104 pivotally connected to a base 105. The boom 104 is selectively extendible (e.g., telescoping) using one or more hydraulic pistons (e.g., piston 148) and the boom 104 is selectively pivoted about the base 105 using one or more additional hydraulic pistons (e.g., piston 150). For example, the hydraulic piston 148 provides motive force to rotate the extendible boom 104 about the base 105 in an upward direction. The hydraulic piston 148 is released and gravitational forces aid the boom 104 pivoting about the base 105 in a downward direction. As a result, a distal end 116 of the boom 104 may be selectively raised and lowered, as well as extended and retracted to perform towing operations (see e.g., operations 500 of FIG. 5).

Figure 2:
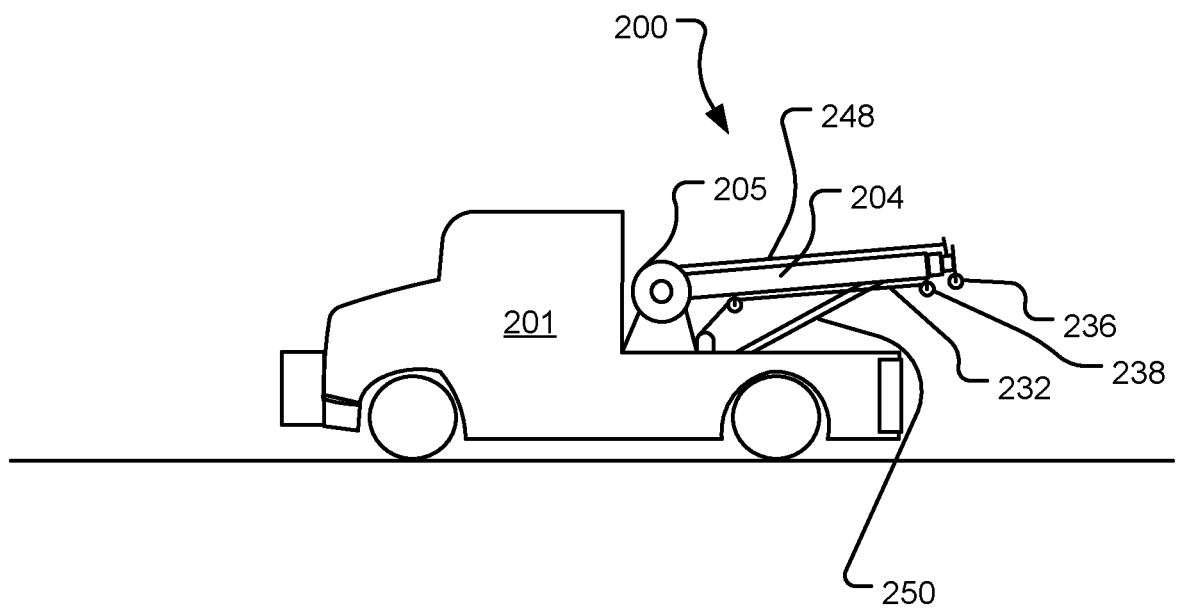
FIG. 2 illustrates a side elevation view of an example extendible boom suspended vehicle towing system in a stowed orientation.

While the extendible boom 104 is depicted in an extended orientation, it may be retracted to a stowed orientation for transit without the vehicle 103 attached (see e.g., FIG. 2). The extendible boom 104 may further include any number of stages (e.g., a 3-stage telescoping boom is shown) to achieve a retracted orientation that meets applicable length requirements of the truck 101 and an extended orientation sufficient to accommodate a foreseeable size of the vehicle 103 to be towed. In other implementations, a system of winches, cables, and pulleys may replace or supplement the hydraulic pistons to selectively move the distal end 116 of the boom 104 (see e.g., extendible boom suspended vehicle towing system 400 of FIG. 4).

To tow the vehicle 103 using the towing system 100, the truck 101 is moved so that it is oriented approximately in line with and in front of the disabled vehicle 103. In various implementations, the vehicle 103 may face the truck 101 (as shown) or face away from the truck 101. The boom 104 is moved from its stowed orientation to its extended orientation, as shown. More specifically, the extended orientation places the distal end 116 of the boom 104 above and slightly behind the disabled vehicle 103 prior to lifting the vehicle 103.

A first towed vehicle attachment mechanism including a pair of cables 130 (or chains, straps, ropes, or lines) connected to a first pair of towed vehicle connectors 140 (e.g., hooks) extends from a first attachment point 136 (e.g., a hook, eye, or pulley) and is located at the distal end 116 of the boom 104 and selectively connects each of two rear corners of the vehicle 103 (e.g., frame attachment points, rear wheels, or opposite sides of a rear axle) to the distal end 116 of the boom 104. In some implementations, a first spreader bar (not shown, see e.g., spreader bar 354 of FIG. 3) is connected to the attachment point 136 and the cables 130 extend downward from opposite ends of the spreader bar to the vehicle 103.

A second towed vehicle attachment mechanism including a pair of cables 132 (or chains, straps, ropes, or lines) connected to a second pair of towed vehicle connectors 142 (e.g., hooks) extends from a second attachment point 138 (e.g., a hook, eye, or pulley) and is located at a proximal end 117 of the boom 104 and selectively connects each of two front corners of the vehicle 103 (e.g., frame attachment points, front wheels, or opposite sides of a front axle) to the proximal end 117 of the boom 104. In some implementations, a second spreader bar (also not shown) is connected to the attachment point 138 and the cables 132 extend downward from opposite ends of the second spreader bar to the vehicle 103.

In various implementations, the towed vehicle connectors 140, 142 are replaced with straps, chains, brackets, or other mechanisms to selectively attach the cables 130, 132 to the vehicle 103. Further, the cables 130, 132 may have rings at their distal ends. The rings are used as attachment points for towing straps with hooks on their ends. The ring and towing strap implementation allows the user to secure hooks (or other attachment mechanisms) to the vehicle 103 at each corner, making it stable for transportation. In some implementations, one of the cables 130 or cables 132 is replaced with a singular cable attached to a front-center or rear-center of the vehicle 103. As a result, the cables 130, 132 are attached to at least three distinct points on the vehicle 103, still making it stable for transportation.

After the first and the second towed vehicle attachment mechanisms are connected to the vehicle 103, to lift the rear of the vehicle 103 from road surface 152, the hydraulic piston 150 is extended to raise the distal end 116 of the boom 104. The rear of the vehicle 103 is raised to a level above the road surface 152 considered sufficient to clear any anticipated obstacles and prevent contact with the road surface 152 as the vehicle 103 is towed. As the distal end 116 of the boom 104 is raised, the proximal end 117 is also raised, but to a lesser extent due to the geometry of the boom 104. As a result, in some implementations, the cables 132 connect to an attachment winch 126 via pulleys 133, 134. The winch 126 selectively raises and lowers the front of the vehicle 103 to level it with the rear of the vehicle 103, and raise the front of the vehicle 103 to a level above the road surface 152 considered sufficient to clear any anticipated obstacles and prevent contact with the road surface 152 as the vehicle 103 is towed. In some implementations, a second winch (not shown) is connected to the cables 130, which further selectively raises and lowers the rear of the vehicle 103 independent of the boom 104 position.

In some implementations, the front of the vehicle 103 may also be raised and/or lowered to a level to align the front of the vehicle 103 with a rear bumper 144 of the truck 101. The boom 104 is then retracted to a point where the front of the vehicle 103 rests against the rear bumper 144. The rear bumper 144 of the truck 101 may be made from a relatively soft material (e.g., plastic or rubber) to keep the vehicle 103 from causing damage to the truck 101, or vice versa, particularly if the vehicle 103 sways during transportation. In some implementations, a fluid catch 146 may be connected to the underside of the vehicle 103 to catch any leaking fluids. The fluid catch 146 may be made from any suitable non-permeable flexible material, such as, without limitation, plastic and rubber. In various implementations, the front and the rear of the vehicle 103 are raised and lowered incrementally and iteratively to achieve a desired towing height and orientation of the vehicle 103 prior to towing. In various implementations, positions of one or more of the attachment points or pulleys 133, 134, 136, 138 are also adjustable.

After the vehicle 103 has been towed to a desired location, the vehicle 103 is lowered back to the road surface 152 by a combination of extending the vehicle 103 away from the rear bumper 144 by extending the boom 104, lowering the front of the vehicle 103 by releasing tension in the cables 132 using the winch 126, and lowering the rear of the vehicle 103 by lowering the distal end 116 of the boom 104. Once the vehicle 103 is safely resting on the road surface 152, the towed vehicle connectors 140, 142 are removed from the vehicle 103 and the boom 104 may be returned to its stowed orientation.

In various implementations, the system 100 may include two separate winches, one for each of two cables 132. The winches may be operated in unison to lift and lower the front of the vehicle 103 and/or separately to level the vehicle 103 side-to-side. In other implementations, the cables 132 are joined into one cable between the towed vehicle connectors 142 and the winch 126 and the singular winch 126 equally selectively retracts and extends the cables 132. Similarly, the system 100 may include one winch for cables 130, or two separate winches, one for each of two cables 130, depending upon the implementation. In addition, the towing system 100 may have one or more additional features similar to those described with reference to towing system 400 of FIG. 4.

FIG. 2 illustrates a side elevation view of an example extendible boom suspended vehicle towing system 200 in a stowed orientation. The towing system 200 is supported by and built upon a truck 201. The towing system 200 includes an extendible boom 204 pivotally connected to a base 205. The boom 204 is selectively extendible using one or more hydraulic pistons (e.g., piston 248) and the boom 204 is selectively vertically pivoted about the base 205 using one or more additional hydraulic pistons (e.g., piston 250). In other implementations, a system of winches, cables, and pulleys may replace or supplement the hydraulic pistons to selectively move a distal end of the boom 204 (see e.g., extendible boom suspended vehicle towing system 400 of FIG. 4).

While the extendible boom 204 is depicted in a stowed orientation, it may be placed in an extended orientation for lifting and towing a disabled vehicle (not shown, see e.g., FIG. 1). In order to move the boom 204 from its extended orientation to its stowed orientation (as shown), the boom 204 is fully retracted and lowered and first and second towed vehicle attachment mechanisms are secured.

More specifically, the first towed vehicle attachment mechanism includes a pair of cables (not shown) connected to a first pair of towed vehicle connectors (also not shown) extending from a first attachment point 236 located at the distal end of the boom 204. Similarly, the second towed vehicle attachment mechanism includes a pair of cables 232 connected to a second pair of towed vehicle connectors (not shown) extending from a second attachment point 238 located at a proximal end of the boom 204. In various implementations, the cables are retracted and the towed vehicle connectors are secured to the attachment points 236, 238 or elsewhere to the truck 201. In other implementations, the towed vehicle connectors are removed from the cables and separately stowed. In some implementations, the towing system 200 also includes one or more spreader bars (not shown, see e.g., spreader bar 354 of FIG. 3). The spreader bar(s) may be removed from the boom 204 and also secured to the truck 201.

Figure 3:
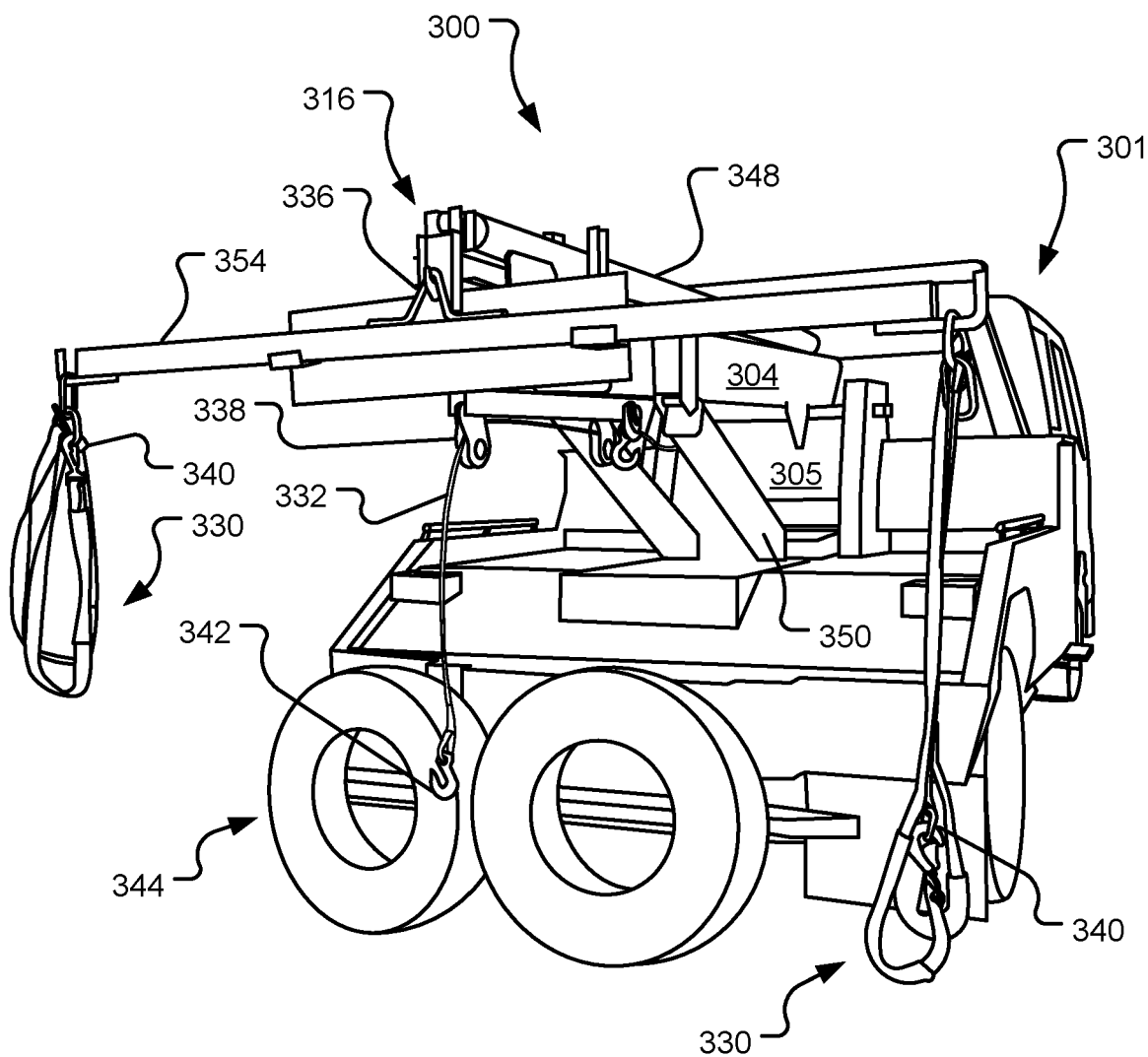
FIG. 3 illustrates a rear elevation view of an example extendible boom suspended vehicle towing system in a stowed orientation.

FIG. 3 illustrates a rear elevation view of an example extendible boom suspended vehicle towing system 300 in a stowed orientation. The towing system 300 is supported by and built upon a truck 301. The towing system 300 includes an extendible boom 304 vertically pivotally connected to a base 305. The boom 304 is selectively extendible using one or more hydraulic pistons (e.g., piston 348) and the boom 304 is selectively pivoted about the base 305 using one or more additional hydraulic pistons (e.g., piston 350). In other implementations, a system of winches, cables, and pulleys may replace or supplement the hydraulic pistons to selectively move a distal end 316 of the boom 304 (see e.g., extendible boom suspended vehicle towing system 400 of FIG. 4). The towing system 300 also includes a rear bumper 344 (here, a pair of tires attached to a rear end of the truck 301) that rests against the front of a towed vehicle (not shown). The rear bumper 344 of the truck 301 is made from a relatively soft material (e.g., plastic or rubber) to keep the towed vehicle from causing damage to the truck 101, or vice versa, if the towed vehicle sways during transportation.

While the extendible boom 304 is depicted in a stowed orientation, it may be placed in an extended orientation for lifting and towing a disabled vehicle. In order to move the boom 304 from its extended orientation (not shown, see e.g., FIG. 1) to its stowed orientation (as shown), the boom 304 is fully retracted and lowered and first and second towed vehicle attachment mechanisms are secured.

More specifically, the first towed vehicle attachment mechanism includes a pair of cables 330 connected to a first pair of towed vehicle connectors 340 extending from opposite sides of a spreader bar 354. The spreader bar 354 is hooked to a first attachment point 336 located at the distal end 316 of the boom 304. The second towed vehicle attachment mechanism includes a cable 332 connected to a second towed vehicle connector 342 extending from a second attachment point 338 located at a proximal end of the boom 304. In various implementations, the cables 330, 332 are retracted and the towed vehicle connectors 340, 342 are secured to the attachment points 336, 338 or elsewhere to the truck 301. In other implementations, the towed vehicle connectors 340, 342 are removed from the cables 330, 332 and separately stowed. In some implementations, the towing system 300 also or alternatively includes a spreader bar for the second towed vehicle attachment mechanism. The spreader bar 354 may be removed from the boom 304 and also secured to the truck 301.

Figure 4:
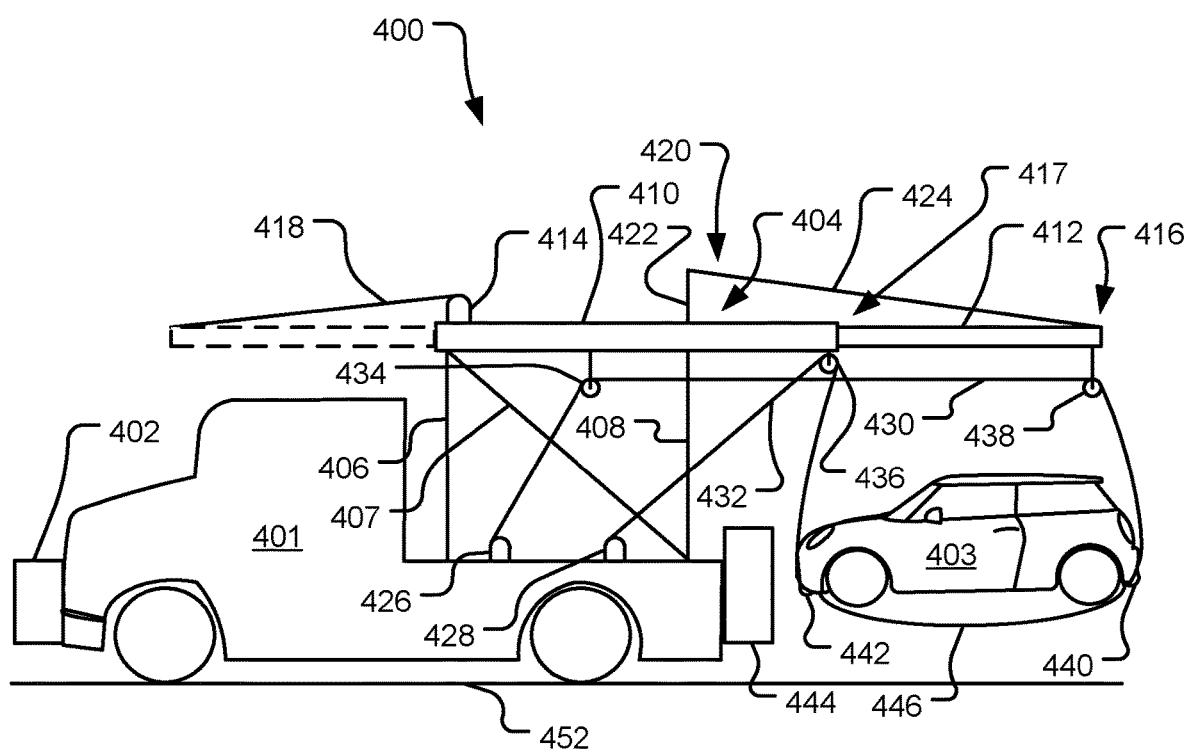
FIG. 4 illustrates a side elevation view of another example extendible boom suspended vehicle towing system in an extended orientation.

FIG. 4 illustrates a side elevation view of another example extendible boom suspended vehicle towing system 400 in an extended orientation. The towing system 400 is supported by and built upon a truck 401. The truck 401 may be any type of flatbed or pickup truck, as long as it is of a sufficient weight and payload capacity support the load of a disabled vehicle 403. To balance the weight of the disabled vehicle 403, a counter weight 402 may be added to the front end of the truck 401. The counter weight 402 may be made of any suitably heavy material (e.g., steel, concrete) and may be either permanently attached or removable from the truck 401.

The towing system 400 includes an extendible boom 404 connected to a pair of A-frame structures 406, 408. The boom 404 is selectively extendible (e.g., telescoping) using boom winch 414 and attachment winch 428. As a result, a distal end 116 of the boom 104 may be selectively extended and retracted to perform towing operations (see e.g., operations 500 of FIG. 5). In other implementations, a system of hydraulic pistons may replace or supplement the winches, cables, and pulleys to selectively move the distal end 416 of the boom 404 (see e.g., extendible boom suspended vehicle towing system 100 of FIG. 1).

To tow the vehicle 403 using the towing system 400, the truck 401 is moved so that it is oriented approximately in line with and in front of the disabled vehicle 403. In various implementations, the vehicle 403 may face the truck 401 (as shown) or face away from the truck 401. The boom 404 is moved from its stowed orientation (shown in dashed lines) to its extended orientation (pushing extendible portion 412 out of the rear of the towing system 400, as shown). More specifically, once the winch 414 is activated, winch cable 418 is retracted, moving the extendible portion 412 of the telescoping boom 404 through fixed portion 410 until the winch cable 418 is retracted into the winch 414 and the extendible portion 412 is extended behind the truck 401. In various implementations, the extended orientation places the distal end 416 of the boom 404 above and slightly behind the disabled vehicle 403 prior to lifting the vehicle 403.

A first towed vehicle attachment mechanism including a pair of cables 430 (or chains, strips, ropes, or lines) connected to a first pair of towed vehicle connectors 440 extending from a first attachment point 438 (e.g., a hook, eye, pulley) and located at the distal end 416 of the boom 404 selectively connects each of two rear corners of the vehicle 403 (e.g., frame attachment points, rear wheels, or opposite sides of a rear axle) to the distal end 416 of the boom 404. In some implementations, a first spreader bar (not shown, see e.g., spreader bar 354 of FIG. 3) is connected to the attachment point 438 and the cables 430 extend downward from opposite ends of the spreader bar to the vehicle 403.

A second towed vehicle attachment mechanism including a pair of cables 432 (or chains, strips, ropes, or lines) connected to a second pair of towed vehicle connectors 442 and extending from a second attachment point 436 (e.g., a hook, eye, pulley) located at a proximal end 417 of the boom 404 selectively connects each of two front corners of the vehicle 403 (e.g., frame attachment points, front wheels, or opposite sides of a front axle) to the proximal end 417 of the boom 404. In some implementations, a second spreader bar is connected to the attachment point 436 and the cables 432 extend downward from opposite ends of the spreader bar to the vehicle 403.

In various implementations, the towed vehicle connectors 440, 442 are replaced with straps, chains, brackets, or other mechanisms to selectively attach the cables 430, 432 to the vehicle 403. Further, the cables 430, 432 may have rings at their distal ends that are used as attachment points for towing straps with hooks on their ends. The ring and towing strap implementation allows the user to secure hooks (or other attachment mechanisms) to the vehicle 403 at each corner, making it stable for transportation. In some implementations, one of the cables 430 or cables 432 is replaced with a singular cable attached to a front-center or rear-center of the vehicle 403. As a result, the cables 430, 132 are attached to three distinct points on the vehicle 403, still making it stable for transportation.

Once the telescoping boom 404 is extended, attachment winches 426, 428 extend cables 430, 432 to lower the towed vehicle connectors 440, 442, respectively, to a height where the towed vehicle connectors 440, 442 can be hooked onto the vehicle 403. To lift the rear of the vehicle 403 from a road surface 452, the attachment winch 426 draws the cable 430 through pulleys 434, 438, retracting the cable 430 and raising the towed vehicle connectors 440. To lift the front of the vehicle 403 from the road surface 452, the attachment winch 428 draws the cable 432 through pulley 436, retracting the cable 432 and raising the towed vehicle connectors 442.

The winches 426, 428 may be operated in unison to raise the vehicle 403 to a level above the road surface 452 considered sufficient to clear any anticipated obstacles and prevent contact with the road surface 452 as the vehicle 403 is towed. The winches 426, 428 may also be operated independently to affect the orientation of the raised vehicle 403 (e.g., the level of the vehicle 403). In various implementations, the front and the rear of the vehicle are raised and lowered incrementally and iteratively to achieve a desired towing height and orientation of the vehicle 403 prior to towing. For example, the front of the vehicle 403 may be raised and/or lowered to align the front of the vehicle 403 with a rear bumper 444 of the truck 401. Further, in various implementations, positions of one or more of the attachment points or pulleys 433, 434, 436, 438 are adjustable.

The boom 404 is then retracted to a point where the front of the vehicle 403 rests against the rear bumper 444. The rear bumper 444 of the truck 401 is made from a relatively soft material (e.g., plastic or rubber) to keep the vehicle 403 from causing damage to the truck 401, or vice versa, if the vehicle 403 sways during transportation. In some implementations, a fluid catch 446 may be connected to the underside of the vehicle 403 to catch any leaking fluids. The fluid catch 446 may be made from any suitable non-permeable flexible material, such as, without limitation, plastic and rubber.

After the vehicle 403 has been towed to a desired location, the vehicle 403 is lowered back to the road surface 452 by a combination of extending the vehicle 403 away from the rear bumper 444 by extending the boom 404, and lowering the vehicle 403 by releasing tension in the cables 430, 432 using the winches 426, 428, respectively. More specifically, the winch 426 releases the winch cable 430 to lower the rear end of the vehicle 403, while the winch 428 releases the winch cable 432 to lower the front end of the vehicle 403. The winches 426, 428 may be activated simultaneously, so that the front end of the vehicle 403 is lowered at the same rate and at the same time as the rear end of the vehicle 403. In other implementations, the front end is lowered before the rear end of the vehicle 403, or vice versa.

Once the vehicle 403 is safely resting on the road surface 452, the towed vehicle connectors 440, 442 are removed from the vehicle 403, the cables 430, 432 are retracted, and the boom 404 is returned to its stowed orientation. More specifically, after the towed vehicle connectors 440, 442 are removed from the vehicle 403, the winches 426, 428 again retract the cables 430, 432. Once the cables 430, 432 are retracted, a clutch on the boom winch 414 is released to create slack in the winch cable 418. The cable 430 is secured to the pulley 438 and the winch 426 retracts the winch cable 430, moving the extendible portion 412 of the telescoping boom 404 through the fixed portion 410 and back to the stowed orientation.

In various implementations, A-frame structures 406, 408 may each be welded or otherwise permanently or non-permeantly attached to the truck 401 (e.g., by bolts or other fasteners). Both the first A-frame structures 406, 408 are made of metal members fastened together to form an "A" shape. Further, The A-frame structures 406, 408 may each be solid or hollow lengths of metal. The lengths of metal may have any suitable cross-sectional shape, such as, without limitation, a circular cross-sectional shape, a rectangular cross-sectional shape, I-beam and W-beam shapes. The system 400 may also include a third supporting member 407 or other structural reinforcements to add additional strength to the A-frame structures 406, 408. In other implementations, the telescoping boom 404 may be supported by more than the two A-frame structures 406, 408. In yet another implementation, structures supporting and attaching the telescoping boom 404 to the truck 401 may not be in an A-frame configuration.

The telescoping boom 404 is mounted substantially parallel to the truck 401 with the first A-frame structure 406 for support on one end and the second A-frame structure 408 for support on the opposing end of the fixed portion 410 of the telescoping boom 404. The telescoping boom 404 may be attached to the A-frame structures 406, 408 in a variety of ways, including, without limitation, by welding or by using bolts as fasteners. The telescoping boom 404 includes the fixed portion 410 and the extendible portion 412. The extendible portion 412 is sized so that it fits inside the fixed portion 410. The extendible portion 412 may be made of hollow or solid metal, for example. Additionally, the extendible portion 412 may have a variety of cross-sectional shapes, with the cross-sectional shape of the extendible portion 412 is compatible with the cross-sectional shape of the fixed portion 410.

The boom winch 414 is mounted on the fixed portion 410 of the telescoping boom 404 and includes the winch cable 418 attached to the end of the extendible portion 412 of the telescoping boom 404, as shown. In other implementations, the telescoping action of the extendible portion 412 of the telescoping boom 404 may be controlled by a hydraulic piston in place of the boom winch 414 (see e.g., FIG. 1). In yet other implementations, the extendible portion 412 of the telescoping boom 404 may be moved between orientations manually and may be kept in place with a mechanical locking mechanism.

When in the extended orientation, the extendible portion 412 is also supported by tensile support 420. The tensile support 420 includes a support member 422 and a tensile support cable 424. The support member 422 extends substantially vertically from the fixed portion 410. The tensile support cable 424 is attached to the top of the support member 422 and the distal end 416 of the extendible portion 412. When the extendible portion 412 is fully extended, the tensile support cable 424 is pulled tight. In the fully extended position, the tensile support cable 424 provides additional support for the extendible portion 412 to support the load of the vehicle 403. When the extendible portion 412 is in its stowed orientation, the tensile support cable 424 is slack. In another implementation, a fourth winch (not shown) may control the length of the tensile support cable 424.

In various implementations, the system 400 may include 3 or four separate attachment winches, one for each of two cables 430 and one of each of two cables 432. The winches may be operated in unison to lift and lower the front and/or rear of the vehicle 403 and/or separately to level the front and/or rear of the vehicle 403 side-to-side. In other implementations, each of the cables 430 and/or each of the cables 432 are joined into a singular cable between the towed vehicle connectors 440, 442 and the winches 426, 428. The singular winch 426 equally selectively retracts and extends the cables 430 and/or the singular winch 428 equally selectively retracts and extends the cables 432. In addition, the towing system 400 may have one or more additional features similar to those described with reference to towing system 100 of FIG. 1.

Figure 5:
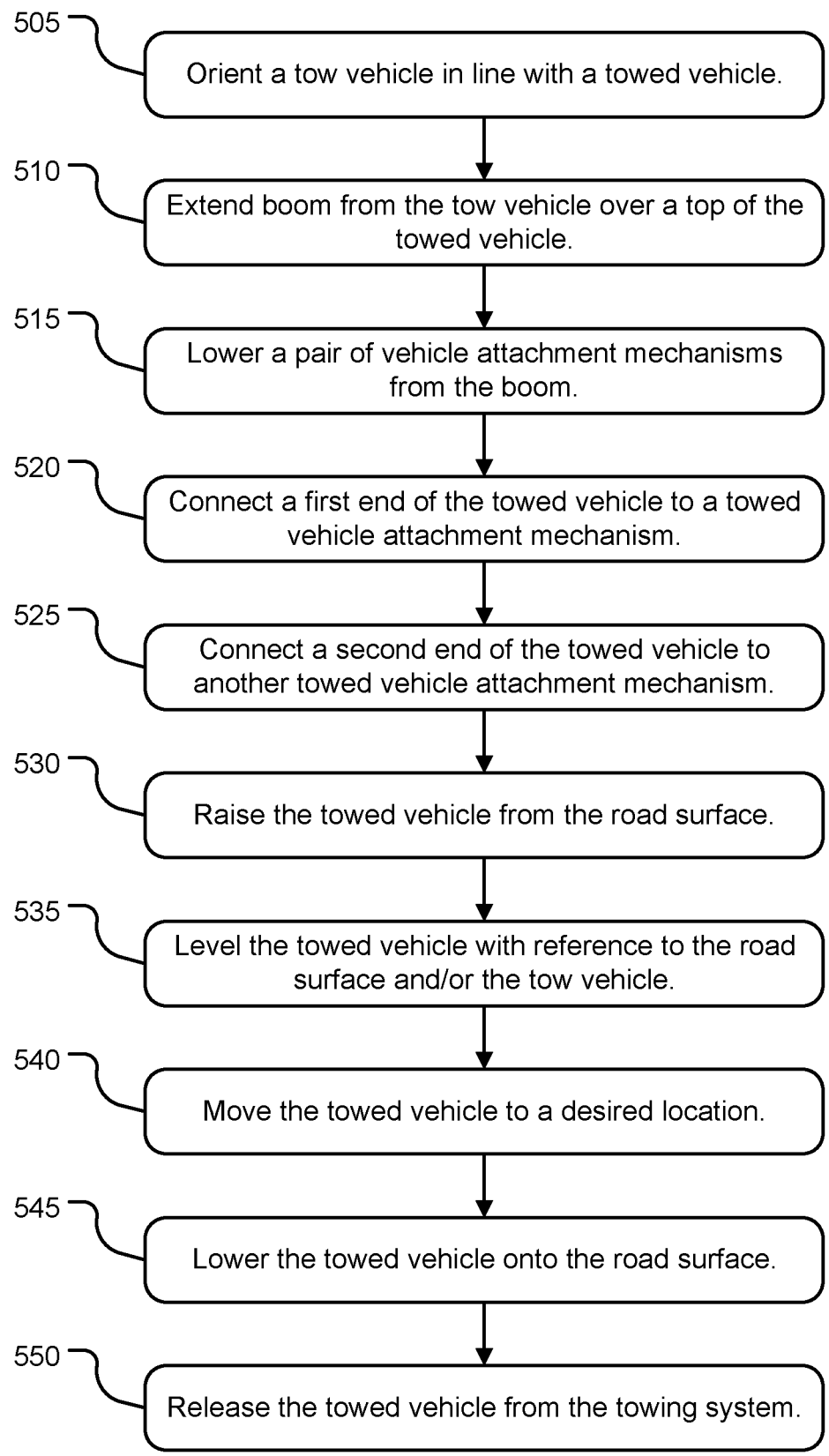
FIG. 5 illustrates example operations for towing a vehicle using an extendible boom suspended vehicle towing system.

FIG. 5 illustrates example operations 500 for towing a vehicle using an extendible boom suspended vehicle towing system. An orienting operation 505 orients a tow vehicle in line with a towed vehicle. The tow vehicle may back up to the front or the rear of the towed vehicle. While orienting operation 505 is not required, the following operations are easier when the tow vehicle is aligned with the towed vehicle with less than a 20% variance in directional orientation between the vehicles.

An extending operation 510 extends a boom from the tow vehicle over a top of the towed vehicle. For hydraulically actuated booms, a hydraulic cylinder provides motive force to extend a telescoping boom from its stowed position to its extended position. For winched extendible booms, a boom winch attached to a fixed portion of the telescoping boom is activated to retract a winch cable attached to an extendible portion of the telescoping boom. When the boom winch is activated, the extendible portion of the telescoping boom moves through the fixed portion from its stowed position to its extended position.

A lowering operation 515 lowers a pair of vehicle attachment mechanisms from the boom. More specifically, the lowering operation 515 may lower hooks for securing the towed vehicle to the towing system. Each of the hooks may be attached to the end of a cable. One or more of the cables may be controlled by a winch mounted to the tow vehicle and/or controlled by action of the boom itself. During the lowering operation, the cables are released and the hooks lower toward the ground.

A first connecting operation 520 connects a first end of the towed vehicle to a first towed vehicle attachment mechanism extending from a distal end of the telescoping boom. In various implementations, the first connecting operation 520 involves connecting a pair of hooks extending from cables forming the first towed vehicle attachment mechanism to each side of a front (or a rear) of the towed vehicle. A second connecting operation 525 connects a second end of the towed vehicle to a second towed vehicle attachment mechanism extending from a proximal end of the telescoping boom. In various implementations, the second connecting operation 525 involves connecting a pair of hooks extending from cables forming the second towed vehicle attachment mechanism to each side of the opposite end of the towed vehicle.

In some implementations, the cables from the first and the second towed vehicle attachment mechanisms may be attached to a split strap, providing two hooks for the front portion of the vehicle and two hooks for the rear portion of the vehicle. In the split strap implementation, each hook is secured substantially equidistant from the center of the vehicle in order to balance it side-to-side. If one or both of the towed vehicle attachment mechanisms include only one hook, the hook is secured as close as possible to the side-to-side center of the vehicle for balance. In some implementations, a fluid catch may be added to the bottom of the towed vehicle to prevent fluids from leaking onto an underlying road surface.

A raising operation 530 raises the towed vehicle from a road surface. More specifically, the hooks extending from the cables forming the first and the second towed vehicle attachment mechanisms are retracted, raising the towed vehicle from the road surface. A leveling operation 535 levels the towed vehicle with reference to the road surface and/or the tow vehicle. More specifically, one or more of the hooks extending from the cables forming the first and the second towed vehicle attachment mechanisms are selectively extended and/or retracted, orienting the towed vehicle as desired with reference to the tow vehicle and/or the road surface. In some implementations, the extendible portion of the telescoping boom may be retracted after the vehicle is raised off of the ground to reduce or prevent excess swinging of the towed vehicle during towing. In further implementations, a soft bumper may be installed on the back of the tow vehicle to keep the towed vehicle from damaging the back of the tow vehicle, or vice versa, if it swings during towing.

A moving operation 540 moves the towed vehicle to a desired location. The towed vehicle is suspended from the tow vehicle using the first and the second towed vehicle attachment mechanisms while the towed vehicle is moved. Once the towed vehicle is towed to the desired location, a lowering operation 545 lowers the towed vehicle onto the road surface. More specifically, the cables suspending the towed vehicle are released and the weight of the towed vehicle moves it towards the road surface, keeping the cables tensioned until the vehicle comes to rest on the road surface. In some implementations, the cables may be released at approximately the same time and rate so that the front and rear wheels of the towed vehicle reach the road surface at approximately the same time. Once the towed vehicle reaches the road surface, the cables are further released so that there is sufficient slack for associated hooks or other connectors to be removed from the towed vehicle.

A releasing operation 550 releases the towed vehicle from the towing system, specifically the first and the second pairs of towed vehicle attachment mechanisms. The hooks are removed from the towed vehicle and the cables and boom are retracted from the towed vehicle putting the towing system in a stowed orientation. The tow vehicle is then ready to move away from the towed vehicle and perform towing operations 500 on another towed vehicle, as needed.

The operations making up the embodiments of the invention described herein are referred to variously as operations, steps, objects, or modules. Furthermore, the operations may be performed in any order, adding or omitting operations as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A vehicle towing system comprising:
a telescoping boom extending from a tow vehicle;
a first towed vehicle attachment mechanism extending from a distal end of the telescoping boom and including a first pair of cables extending from the telescoping boom, each cable physically separated by a spreader bar and terminating with a towed vehicle connector; and
a second towed vehicle attachment mechanism extending from a proximal end of the telescoping boom, wherein a length of the second vehicle attachment mechanism is variable to level a towed vehicle in a suspended state, and wherein the tow vehicle is configured to be oriented in line with the towed vehicle and the first and the second towed vehicle attachment mechanisms are configured to suspend an entirety of the towed vehicle above a road surface while the tow vehicle is in motion.

2. The vehicle towing system of claim 1, wherein a length of the first vehicle attachment mechanism is also variable.

3. The vehicle towing system of claim 1, further comprising:
a base attached to the tow vehicle, wherein the telescoping boom extends from the base and is vertically pivotable about the base.

4. The vehicle towing system of claim 3, further comprising:
a first hydraulic piston to selectively vertically pivot the telescoping boom about the base; and
a second hydraulic piston to selectively extend the telescoping boom from the base.

5. The vehicle towing system of claim 1, further comprising:
a boom winch to selectively extend the telescoping boom.

6. The vehicle towing system of claim 1, further comprising:
an attachment winch to selectively vary the length of the second vehicle attachment mechanism.

7. The vehicle towing system of claim 2, further comprising:
an attachment winch to selectively vary the length of the first vehicle attachment mechanism.

8. The vehicle towing system of claim 1, wherein the telescoping boom extends over a top of a towed vehicle in an extended orientation.

9. The vehicle towing system of claim 1, wherein the telescoping boom lowers and retracts in a stowed orientation.

10. The vehicle towing system of claim 1, further comprising:
a fluid catch connected to an underside of the towed vehicle.

11. The vehicle towing system of claim 1, wherein the second towed vehicle attachment mechanism includes a second pair of cables extending from the telescoping boom, each cable connected to a towed vehicle connector.

12. The vehicle towing system of claim 1, wherein the second towed vehicle attachment mechanism also includes a spreader bar, wherein the spreader bar physically separates each of two cables extending from the proximal end of the telescoping boom.

13. The vehicle towing system of claim 1, further comprising:
a front counter-weight to offset weight of the towed vehicle in the suspended state.

14. The vehicle towing system of claim 1, further comprising:
a rear bumper to provide a forward resting place for the towed vehicle in the suspended state.

15. A method of towing a vehicle comprising:
orienting a tow vehicle in line with a towed vehicle;
extending a telescoping boom from the tow vehicle over a top of the towed vehicle;
connecting a first end of the towed vehicle to a first towed vehicle attachment mechanism extending from a distal end of the extended boom, the first towed vehicle attachment mechanism including a first pair of cables extending from the telescoping boom, each cable physically separated by a spreader bar and terminating with a towed vehicle connector;
connecting a second end of the towed vehicle to a second towed vehicle attachment mechanism extending from a proximal end of the extended boom;
raising the towed vehicle from a road surface;
leveling the towed vehicle with reference to the road surface in a suspended state using a variable length of the second vehicle attachment mechanism; and
moving the towed vehicle while in the suspended state above the road surface to a desired location.

16. The method of claim 15, wherein the raising operation and the leveling operation are performed iteratively to achieve a desired height and orientation of the towed vehicle with reference to the tow vehicle.

17. The method of claim 15, further comprising:
lowering the towed vehicle onto the road surface; and
releasing the towed vehicle from the first and the second pairs of towed vehicle attachment mechanisms.

18. The method of claim 15, wherein the raising the towed vehicle from a road surface includes vertically pivoting the telescoping boom with reference to a base attached to the tow vehicle.

19. The method of claim 15, wherein the raising the towed vehicle from a road surface includes varying a length of each of the first and the second pairs of towed vehicle attachment mechanisms.

20. An extendible boom suspended vehicle towing system comprising:
a base attached to a tow vehicle;
a telescoping boom extending from the base and vertically pivotable about the base;
a first hydraulic piston to selectively vertically pivot the telescoping boom about the base;
a second hydraulic piston to selectively extend the telescoping boom from the base;
a first towed vehicle attachment mechanism extending from a distal end of the telescoping boom and including a first pair of cables extending from the telescoping boom, each cable physically separated by a spreader bar and terminating with a towed vehicle connector; and
a second towed vehicle attachment mechanism extending from a proximal end of the telescoping boom, wherein a length of the second towed vehicle attachment mechanism is variable to level a towed vehicle in a suspended state, and wherein the tow vehicle is configured to be oriented in line with the towed vehicle and the first and the second towed vehicle attachment mechanisms are configured to suspend an entirety of the towed vehicle above a road surface while the tow vehicle is in motion.

\* \* \* \* \*